US005136332A

United States Patent [19]

Johnson

[11] Patent Number: 5,136,332

[45] Date of Patent: Aug. 4, 1992

[54] OVERRIDABLE WORM GEAR DRIVE FOR MULTICOLOR IMAGE FORMING APPARATUS

[75] Inventor: Kevin M. Johnson, Rochester, N.Y.

[73] Assignee: Eastman Kodak Company, Rochester, N.Y.

[21] Appl. No.: 685,251

[22] Filed: Apr. 15, 1991

[51] Int. Cl.$^5$ ........................ G03G 21/00; F16H 37/06

[52] U.S. Cl. ................................ 355/202; 74/665 Q; 74/724; 355/200

[58] Field of Search ............... 355/202, 200, 273, 277, 355/271; 74/724, 665 C, 665 H, 665 Q, 206, 425

[56] References Cited

U.S. PATENT DOCUMENTS 3,285,083 11/1966 Singer .................................. 74/207
4,093,056 6/1978 Burgers ............................ 74/206 X
4,215,592 8/1980 Calvert ............................ 74/665 C
4,266,444 5/1981 Anderson et al. ............ 74/665 C X
4,994,827 2/1991 Jamzadeh et al. .............. 355/326 X
5,021,829 6/1991 Johnson et al. ................. 355/271 X
5,021,835 6/1991 Johnson .............................. 355/271

FOREIGN PATENT DOCUMENTS 0747784 10/1944 Fed. Rep. of Germany .

*Primary Examiner*—A. T. Grimley
*Assistant Examiner*—Nestor R. Ramirez
*Attorney, Agent, or Firm*—Leonard W. Treash, Jr.

[57] ABSTRACT

A multicolor image forming apparatus creates a series of different color toner images on a rotatable image member. The toner images are transferred in registration to a receiving sheet carried by a transfer drum. The transfer drum is driven by the image member during transfer but is driven by an independent overridable drive between images. The independent overridable drive includes a worm gear which engages a gear fixed to the transfer drum to rotate the transfer drum. The worm gear is mounted on a rotatable shaft which is driven by a stepper motor. The shaft rotates the worm gear but the worm gear can slide on the shaft or otherwise move axially. A shoulder limits axial movement providing positive drive for the transfer drum. When the image member contacts the receiving sheet and begins to drive the transfer drum it overrides the worm gear and the worm gear separates or floats away from the limiting shoulder. This overridable drive provides precise rotation when driving and permits smooth and non-cogging overriding.

9 Claims, 6 Drawing Sheets

OVERRIDABLE WORM GEAR DRIVE FOR MULTICOLOR IMAGE FORMING APPARATUS

TECHNICAL FIELD

This invention relates to a multicolor image forming apparatus generally of the type in which a series of different color toner images are transferred in registration to a receiving surface associated with a rotatable transfer drum. It also relates to an overridable drive, which drive is particularly usable in rotating such a transfer drum.

BACKGROUND ART

U.S. patent application Ser. No. 07/532,831, MULTICOLOR IMAGING APPARATUS WITH IMPROVED TRANSFER MEANS, filed in the name of Kevin M. Johnson on Jun. 4, 1990, shows a multicolor image forming apparatus in which a series of electrostatic images are formed on a rotable image member. These images are toned by the application of different color toners to each image to create a series of different color toner images. The images are then transferred in registration to a receiving sheet carried by a transfer drum. The transfer drum and the image member form a nip for the superposition of the images. While images are being transferred, the transfer drum is driven by frictional engagement between the image member and the receing sheet on the transfer drum. To provide precise registration, the image member and transfer drum are kept out of contact between images and the transfer drum is precisely reindexed during this time. As shown in FIGS. 28 and 29 of that application, the separation between the image member and transfer drum is provided by a stop for the transfer drum that maintains a separation between transfer drum and image member less than the thickness of a compressed transfer sheet, against which stop the transfer drum is urged by a force applying means that provides pressure for transfer.

Reindexing is accomplished by a stepper motor which is connected to the shaft of the transfer drum which rotates the transfer drum to a home position between images and then rotates it from the home position in response to a signal indicating the rotational position on the image member of the next toner image to be transferred. At this point the transfer drum is driven by the stepper motor up to a peripheral speed approaching the speed of the image member. When the receiving sheet enters the nip for the next image the rotation of the image member takes over the driving of the transfer drum and the stepper motor can be allowed to move at a non-critical speed at this point. The quality of registration of the toner images is dependent upon the preciseness of this re-contacting between the image member and the receiving sheet.

DISCLOSURE OF THE INVENTION

It is an object of the invention to provide an image forming apparatus generally of the type described which includes an overridable drive means for the transfer drum which is both simple in construction and extremely precise in its rotation os the transfer drum before and as the receiving sheet contacts the image member.

This and other objects are accomplished by providing such apparatus with an overridable drive which includes a gear rotatable with the transfer drum and a worm gear engageable with the rotatable gear. The worm gear is mounted on a rotatable shaft. The worm gear is rotationally fixed with respect to the shaft for rotation by the shaft about an axis of rotation but axially movable, for example, by sliding on the shaft. Means, such as a shoulder on the shaft, are provided for limiting axial movement of the worm gear on the shaft to effect driving of the movable gear. The worm gear is adapted to float away from the limiting means when the worm gear is overridden by the rotatable gear.

With such a structure, the image member and the transfer drum can be timed to provide contact between the image member and the receiving sheet with the image member moving slightly faster at the instant of contact than the receiving sheet. At this point, the image member takes over rotation of the transfer drum through the receiving sheet and the worm gear gradually floats away from the shoulder as it is overridden.

When the image member and receiving sheet are not in contact, the worm gear is immediately seats on its shoulder and precisely drives the transfer drum. We have found that this type of mechanism provides the desired precision in reindexing and is free of cogging in the main transfer portion of the cycle.

The invention is particularly usable in an image forming apparatus in which the toner images are formed using a laser exposure. The smoothness with which the worm drive is overridden reduces the risk of a jar to the image member that would affect an exposure taking place at the same time.

The invention has wider application than just to a multicolor image forming apparatus since it can be applied to other applications requiring preciseness in drive and smoothness as the drive changes from a drive condition to an overridden condition.

BRIEF DESCRIPTION OF THE DRAWINGS

In the detailed description of the preferred embodiment of the invention presented below, reference is made to the accompanying drawings, in which.

BEST MODE OF CARRYING OUT THE INVENTION

Although this invention is believed to have wider application, it was designed as an improvement in the apparatus disclosed in my U.S. patent application Ser. No. 07/532,831, filed Jun. 4, 1990, which application is incorporated by reference herein.

Figure 1:
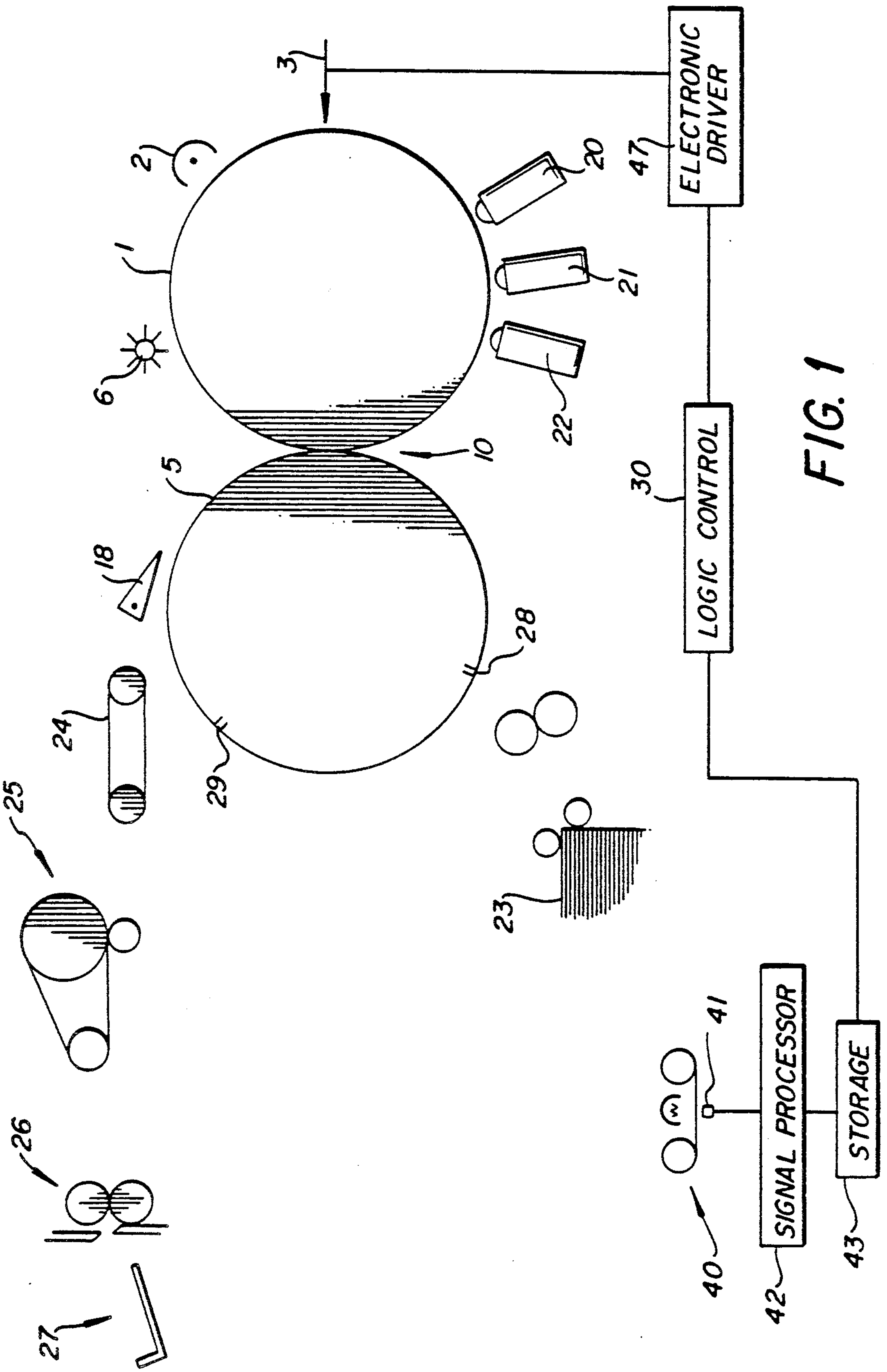
FIG. 1 is a schematic front view of an image forming apparatus in which the invention is particularly useful.

According to FIG. 1, a multicolor image forming apparatus includes an image member 1. Image member 1 can be a drum havin one or more photoconductive layers for forming electrostatic images on its cylindrical image surface. Image member 1 could also be a drum around which a photoconductive web has been attached which combines the advantages of a drum in preciseness of control with the low cost replacement advantage of a web.

Image member 1, is rotated by a motor not shown in FIG. 1, past a series of electrophotographic stations, all well known in the art. A charging station 2 uniformly charges an image surface of the drum 1. The uniformly charged image surface is exposed at an exposure station, for example, laser exposure station 3, to create a series of electrostatic images, each representing a color separation of the color multicolor image to be formed. The series of electrostatic images are toned by different color toner stations 20, 21 and 22, one different color for each image, to create a series of different color toner images. The images are then transferred in registration to a receiving surface of a receiving sheet carried on the periphery of a transfer roller or drum 5. The drum 1 is cleaned by cleaning station 6 and reused.

The receiving sheet is fed from a receiving sheet supply 23 into a nip 10 between drums 1 and 5. As it approaches nip 10 it is secured to drum 5 by a vacuum means, gripping fingers, or other mechanism. For example, the leading end of the sheet can be secured by a row of vacuum holes 29 and the trailing end by a row of vacuum holes 28.

After all three (or four) color separation toner images have been transferred to the receiving surface of the receiving sheet, the leading edge of the receiving sheet is stripped from drum 5 by stripping mechanism 18. The receiving sheet is pushed by further rotation of drum 5 onto a sheet transport 24 which carries it to a fixing device 25 and then to other optional post-treatment stations, such as cutter 26 and finally to an output tray 27. The input for exposure station 3 begins with a color scanner 40 which includes a three color CCD 41 for scanning an original to be printed, for example, 35mm color negative film. The output from CCD 41 is fed to a signal processor 42 which converts the CCD signal into a form suitable for storing in memory. For example, signal processor 42 can use suitable compression algorithms to save storage, enhance the image in both its color aspects and its resolution, including color masking, halftone screening, etc., all processes known in the art. After such signal processing, image information is stored in a suitable storage 43.

A logic and control 30 is capable of accessing the storage 43 and also controls the general timing of the apparatus. It supplies the signal from storage 43 to an electronic driver 47 for electronic exposure station 3 to control the intensity of a laser, LED printhead, or the like, making up that station.

The process illustrated in FIG. 1 can be capable of extremely high quality imaging. The quality of that imaging is dependent on many portions of the process. In particular, it is dependent on the resolution of the exposure device 3, the size of the toners used to create toner images, and the registration associated with the exposure and transfer stations. To provide the highest quality of color print, extremely fine toners are necessary. It is presently possible to tone images with dry toners as small as 3.5 microns and smaller which toners provide extremely high quality images if correctly registered.

Transfer of extremely fine toners is difficult to do electrostatically. Better results are obtained by a combination of heat and pressure. If substantial pressures are used in the transfer process, for example, pressures in excess of 40 pounds per squar inch, and if both the transfer drum and the image member are independently driven, there is substantial risk that the transfer drum drive will cog the drive of the image member degrading image quality. There is also a likelihood of excessive wear to the surfaces in contact which wear is especially damaging to the photoconductive surface of the imaging member. To prevent such image degradation and wear, the transfer drum is frictionally driven by the image member.

To maintain extremely precise registration for full utiliazation of extremely fine toner particles and high quality exposure, the transfer drum is maintained out of contact with the image member and reindexed between transfer of consecutive images, i.e., once each drum revolution.

As described in my earlier application Ser. No. 07/532,831, mentioned above, this particular approach provides extremely precise registration of the images with respect to transfer drum 5. It is illustrated best in FIGS. 2 and 3. Transfer drum 5 is fixed to a shaft 125 and is spring-urged toward image member 1. A pair of disks 161 and 162 are also supported by shaft 125 but are rotatable with respect to it. Disks 161 and 162 have a radius slightly less than the combined radius of heated transfer drum 5 and a receiving sheet 75 when sheet 75 is compacted by image member 1 and drum 5 in the nip 10. As shown in FIG. 3, at the end of transfer, as the receiving sheet 75 leaves the nip, the spring loaded shaft 125 moves toward image member 1 until disks 161 and 162 contact the surface of image member 1 outside the image area.

Disks 161 and 162 are mounted on shaft 125 and are free to rotate with respect to it. As shown in FIG. 3, transfer drum 5 is now separated from image member 1 and can be rotated by a suitable indexing drive 100 through shaft 125. Drive 100 rotates transfer drum 5 until it reaches a home position as controlled by a sensor 12 which senses a mark 111 on the periphery of transfer drum 5. Transfer drum 5 is then rotated from its home position in time relation to the rotation of image member 1. This can be controlled by a sensor 13 which senses a mark 112 on image member 1 or by encoder 67, or both. 2mage member 1 is driven by a motor 118 and may also include a flywheel (not shown) to steady its rotation.

Figure 2:
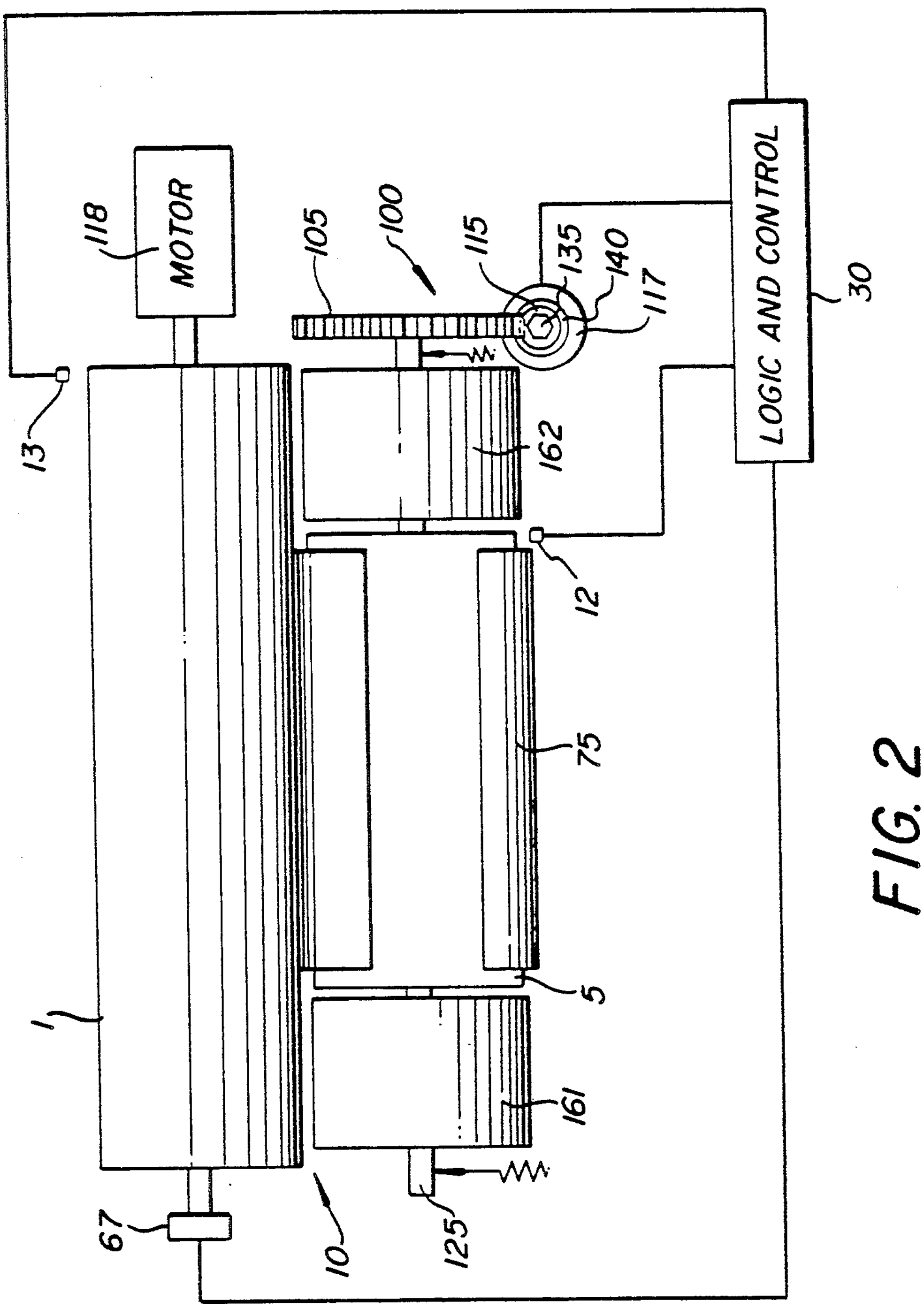
FIGS. 2 and 3 are top view with portions schematic of the image member and transfer drum of the apparatus shown in FIG. 1.
Figure 3:
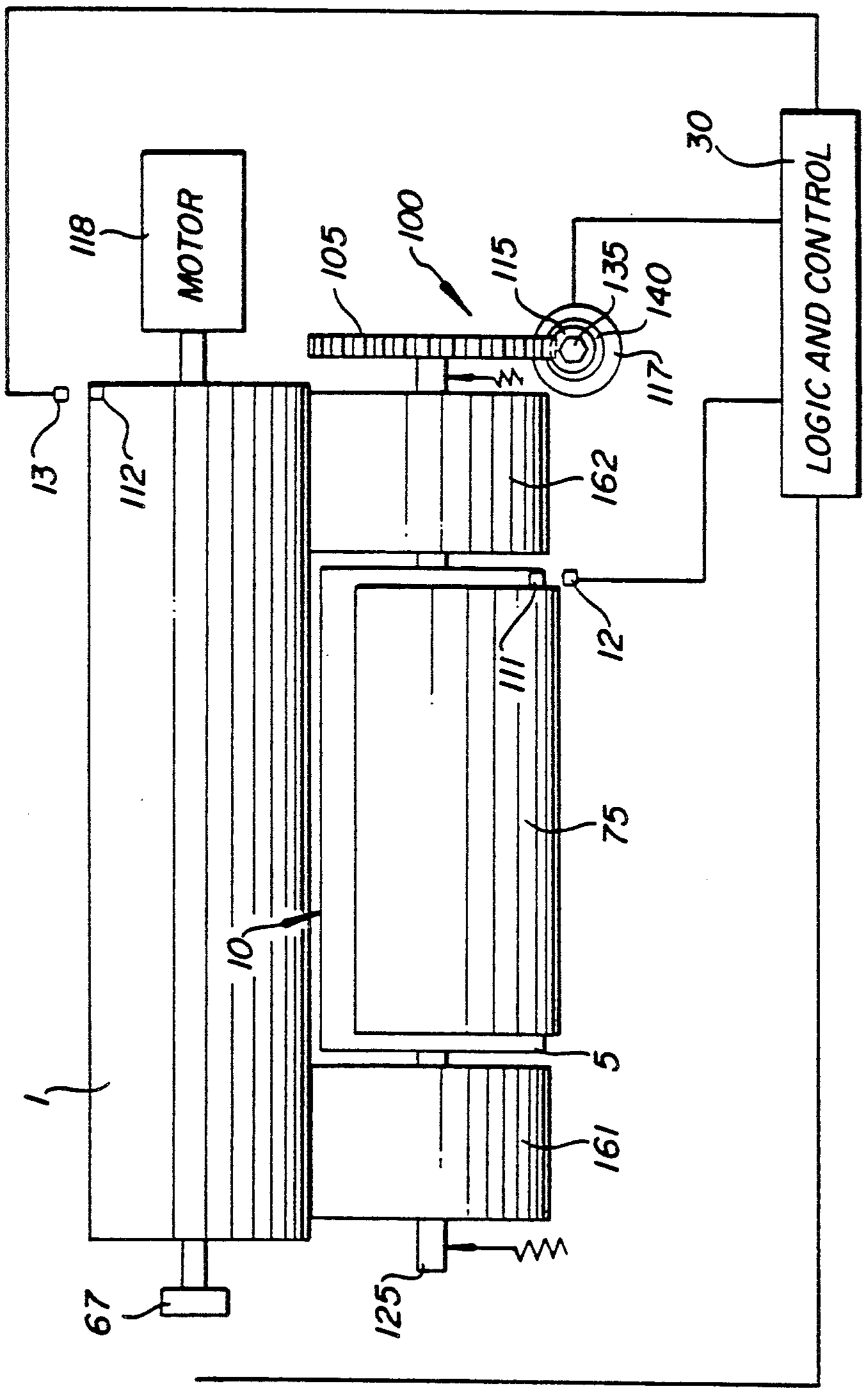

The thickness of receiving sheet 75 and the separation between image member 1 and disks 161 and 162 have been exaggerated in FIGS. 2 and 3 to aid the explanation. Disks 161 and 162 can be made less than 0.002 inches in radius less than the radius of the compact receiving sheet and transfer drum 5. Thus, the movement of shaft 125 as the edge of the receiving sheet leaves the nip is very slight.

Figure 8:
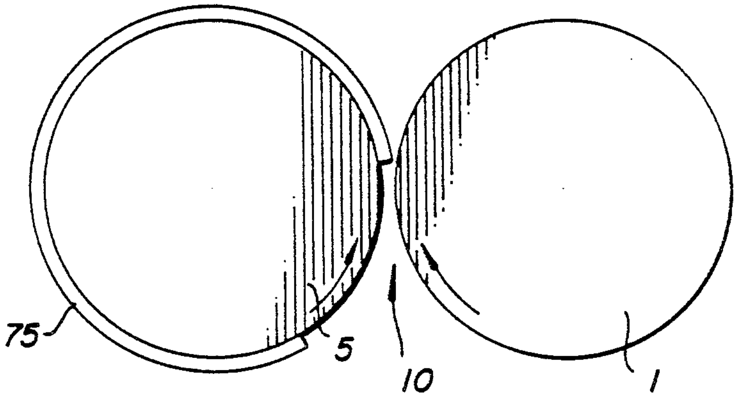
Figure 9:
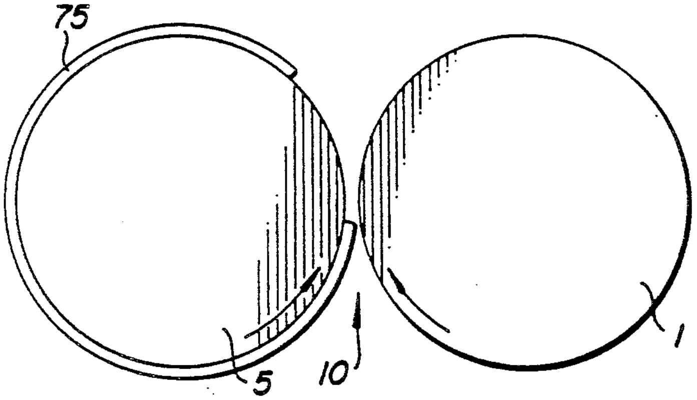
Figure 10:
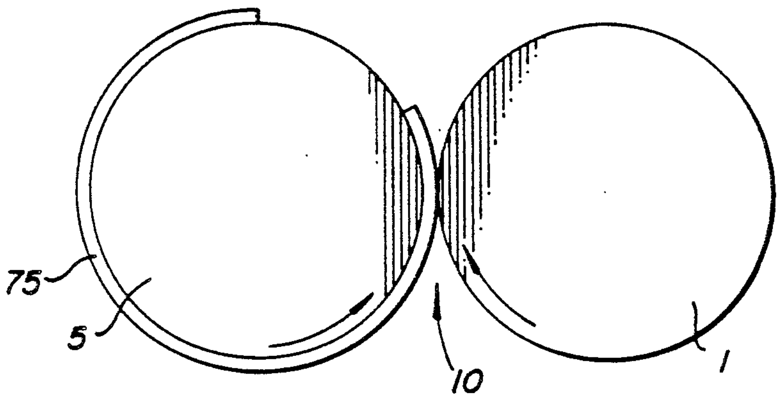
Figure 11:
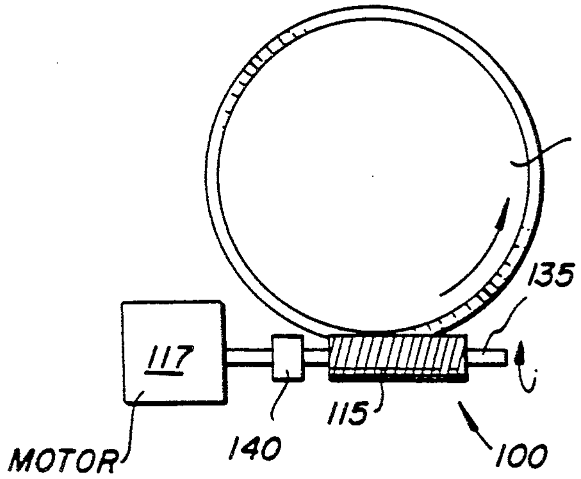
FIGS. 11-14 are schematic front views of the transfer drum and the worm drive for it and are intended to mate with FIGS. 7-10, respectively, and illustrate the condition of the overridable drive at the points of time illustrated in FIGS. 7-10.

The rotation of transfer drum 5 is best illustrated by FIGS. 7-10. According to FIG. 7, transfer drum 5 is being driven during image transfer by contact between image member 1 and receiving sheet 75. According to FIG. 8, as receiving sheet 75 leaves nip 10, contact between image member 1 and receiving sheet 75 is lost and because of disks 161 and 162 (FIGS. 2 and 3), image member 1 and transfer drum 5 maintain a separation. Transfer drum 5 is then driven by drive means 100 (as will be described in more detail below) until sensor 12 senses mark 111 (FIG. 3). Transfer drum 5 is then held at this "home" position until a signal from logic and control 30 indicates the mark 112 has been sensed by sensor 13 or that encoder 67 indicates that the next image to be transferred has reached an appropriate rotational position on the path of the image member 1. For example, logic control 30 can count a set number of encoder pulses after a beginning of scan of laser 3 (FIG. 1) which will indicate the appropriate position of the beginning of the next image to be transferred. At this pont, drive means 100 begins again to drive transfer drum 5 until receiving sheet 75 approaches nip 10 as shown in FIG. 9. As receiving sheet 75 contacts image member 1, the rotation of image member 1 takes over rotation of transfer drum 5 as shown in FIG. 10 and the cycle is repeated.

This emgagement of the receiving sheet 75 with image member 1 is critical. The drive 100 provides precise rotation of drum 5 between the "home" position and the point of engagement of receiving sheet 75 with image member 1 and then allows itself to be smoothly overridden by image member 1.

Referring to FIGS. 2, 3, 5 and 6, drive 100 includes a driven gear 105 fixed to shaft 125 for driving transfer drum 5. Driven gear 105 is driven by a worm gear 115. Worm gear 115 is supported by a shaft 135 which is rotated by a stepper motor 117. The worm gear and its shaft can be spring loaded into the teeth of gear 105 or gears 105 and 115 can be fixed with respect to each other by a conventional mount, not shown. Shaft 135 is polygonal in cross-section (see FIGS. 2 and 3) to positively rotate worm gear 115 as it is rotated by motor 117. However, worm gear 115 is free to slide on shaft 135 toward and away from a shoulder 140 which limits the axial movement of worm gear 115 in one direction.

The operation of drive 100 is bet illustrated by FIGS. 11–14 which show the drive's condition corresponding to the positions of transfer drum 5 and image member 1 in FIGS. 7–10, respectively. According to FIGS. 2 and 3, image member 1 is driven by motor 118 at a speed which will drive transfer drum 5 through receiving sheet 75 at a speed slightly faster than transfer drum 5 would be driven by stepper motor 17 through worm gear 15. Thus, while drum 5 is driven by image member 1 (FIGS. 7 and 11), worm gear 115 is not seated on shoulder 140 and is floating on shaft 135 while motor 117 rotates at a non-critical speed maintaining at least some separation between worm gear 115 and shoulder 140.

Figure 12:
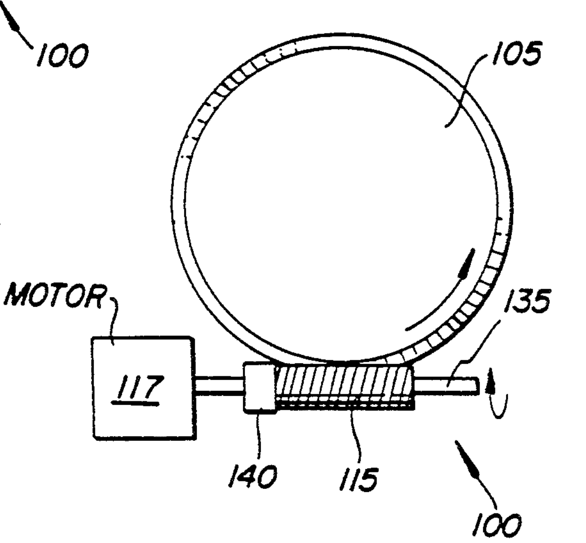
Figure 13:
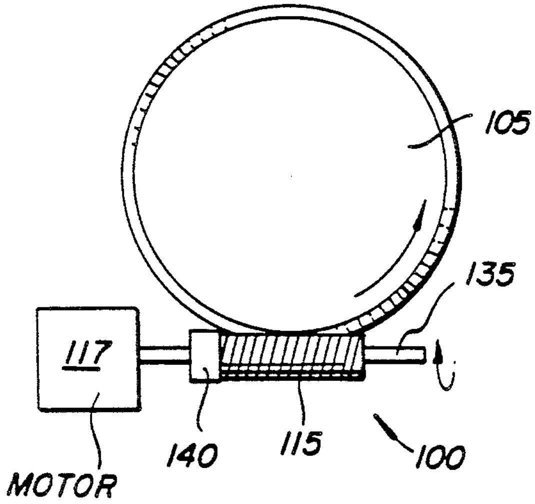
Figure 14:
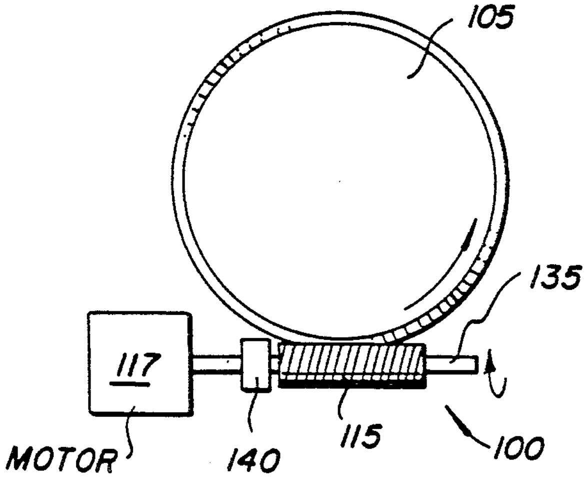

As seen in FIG. 8, as receiving sheet 75 leavs nip 10, transfer drum 5 is no longer driven by image member 1 and begins to slow down, immediately seating worm gear 115 on shoulder 140 (FIGS. 12). Stepper motor 117 now drives transfer drum 5 through worm gear 115 as worm gear 115 is seated on shoulder 140. This drive has a very high reduction providing precise control by the worm gear over the transfer drum. The worm gear and stepper motor 117 drive the drum to its home position as illustrated in FIG. 3 and then in response to an appropriate signal from logic and control 30 drive the transfer drum toward its critical registration as receiving sheet 75 enters nip 10 as illustrated in FIGS. 9 and 13. As receiving sheet 75 contacts image member 1 in nip 10, image member 1 immediately takes over the drive of transfer drum 5.3 Because image member 1 is driven slightly faster than stepper motor 117 is driving transfer drum 5 through worm gear 115, worm gear 115 begins to separate from shoulder 140 as shown in FIG. 14. This allows a smooth, overriding of stepper motor 117 without cogging or fighting of the main drive by stepper motor 117 or by worm gear 115.

Figure 4:
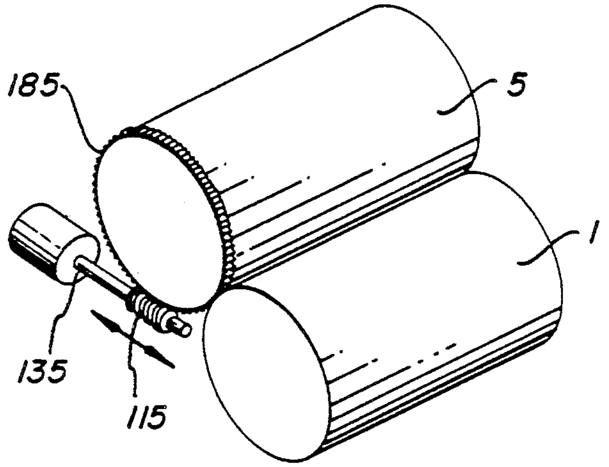
FIGS. 4 and 5 are perspective views illustrating alternative forms of the invention.
Figure 5:
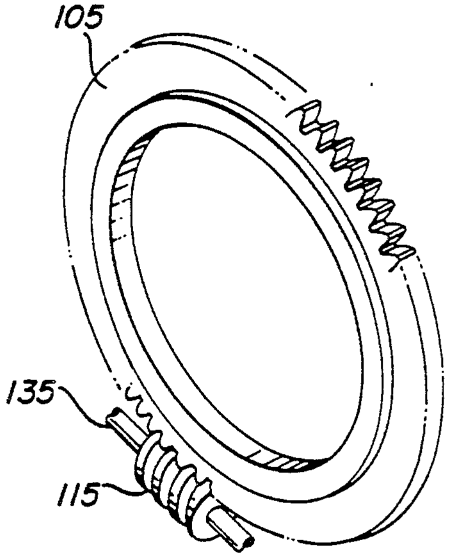
Figure 6:
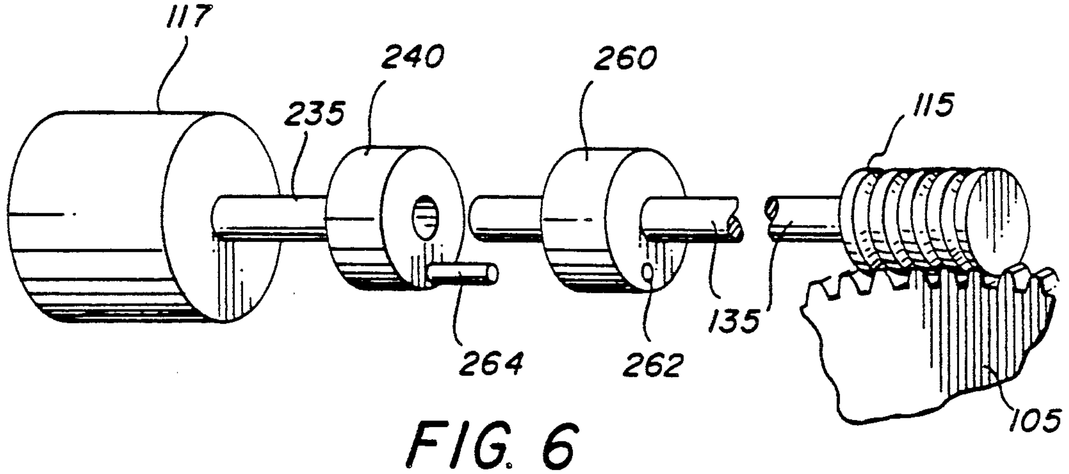
FIG. 6 is an exploded perspective view illustrating a preferred from of the drive for the apparatus shown in FIGS. 1-3.
Figure 7:
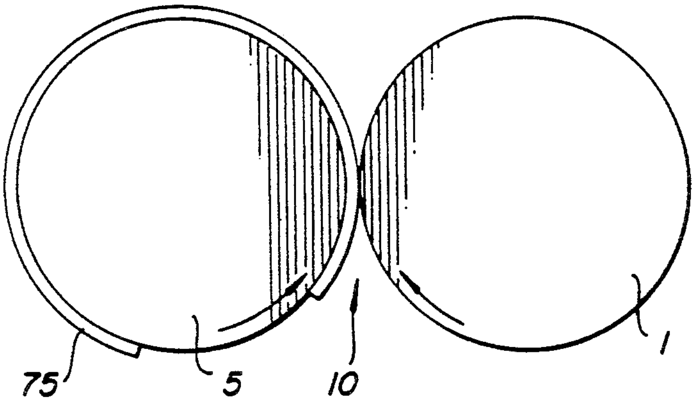
FIGS. 7-10 are schematic front views of the image member and transfer drum illustrating four points in a cycle of operation in transferring an image.

According to FIG. 5 (and as illustrated in FIGS. 2 and 3), driven gear 105 can be a separate gear attached to shaft 125 or it can be a set of gear teeth 185 fixed to transfer drum 5 as shown in FIG. 4.

Worm gear 115 need not slide on shaft 135 to float axially. According to FIG. 6, worm gear 115 is axially and rotationally fixed to shaft 135 which in turn is fixed to a disk 260. A limiting disk 240 is supported on a motor shaft 235 and carries a pin 264 which slides in a bore 262 in disk 260. With this embodiment, worm gear 115 floats away from limiting disk 240 as disk 260 slides on pin 264. DIsk 240 thus performs the function of shoulder 140 in the 11–14 embodiment.

It is important that worm gear 115 not axially move while being overriden to the extreme that it falls off shaft 135 (or pin 264 leaves bore 262) or that it engages shoulder 140 and thus begins driving transfer drum 5. To prevent this, motor 117 can be carefully controlled to run at a speed very slightly less than that which would drive transfer drum 5. Alternatively, motor 117 can be controlled during this time by a pair of sensors (not shown) responsive to extreme axial positions of worm gear 115.

In the FIGS. 1–3 apparatus the multicolor image is formed on receiving sheet 75 which is wrapped on transfer drum 5. However, the invention could be used in a system in which the images are transferred directly to an outer surface of drum 5 in registration and then transferred in one step to a receiving sheet. Drums 5 and 1 would be separated between images by a camming or similar structure for reindexing.

Note that the axis of tansfer drum 5 moves slightly as it rides up and down off receiving sheet 75 and onto disks 161 and 162. To the extent that this movement affects the registration provided by worm gear 115, motor 117 can be fixed to the mount for transfer drum 5 thereby move with it. Alternatively, worm gear 115 can be mounted with shaft 135 generally in a direction transverse to a line between the axes of image member 1 and drum 5 thereby essentially removing the effect of the small amount of movement of drum 5 from the precision of worm gear 115.

Although the overridable worm gear drive 100 shown in FIGS. 2–14 has exceptional utility in this particular application in assuring registation of transfer drum 5, it can be used in other applications for a drive mechanism requireing both precision in driving and smoothness when being overriden.

The invention has been described in detail with particular reference to a preferred embodiment thereof, but it will be understood that variations and modifications can be effected within the spirit and scope of the invention as described hereinabove and as defined in the appended claims.

I claim:

1. A multicolor image forming apparatus comprising:
a rotatable image member having an image surface,
means for forming a series of different color toner images on said image surface,
means for rotating said image member,
a rotatable transfer drum positioned to move a toner image receiving surface through a transfer nip formed with said image surfce to receive said toner images in registration to form a multicolor image on said transfer surface, said transfer drum being rotatable by frictional contact between the image surface and the receiving surfaace during tansfer of said toner images, means providing a separation between the image surface and the receiving surface when no images are being transferred in the nip, and means for roating said transfer drum when the image surface and receiving surface are separated, said means including a transfer drum gear fixed for rotation with said transfer drum, a worm gear drivingly engaging said transfer drum gear, and means for rotating said worm gear in a driving direction with respect to said tansfer drum gear, said means for rotating said worm gear including a rotatable shaft which is rotationally fixed with respect to said worm gear, and means for limiting axial movement of said worm gear in one direction, said worm gear seating on said limiting means to drive said transfer drum when said transfer drum is not driven by said image member and said worm gear floating away from said limiting means when said worm gear is overridden by said transfer drum gear when said transfer drum is rotated by said image member.

2. A multicolor image forming apparatus comprising a drum-shaped image member, means for forming a series of toner images on said image member, a transfer drum including a cylindrical surface for supporing a receiving sheet, said transfer drum and image member being mounted to form a nip in which said image member contacts a receiving sheet carried by said transfer drum to transfer toner images in registration to said receiving sheet and to drive said transfer drum through said contact with said receiving sheet, P, means for providing a separation between said transfer drum and said image member when no receiving sheel is in said nip, and means for rotating said transfer drum independent of said image member, said means for rotating being overridable by said image member, said means for rotating including a rotatable gear fixed with respect to said transfer drum, a rotatable shaft, a worm gear engaging said rotatable gear and mounted on said shaft, said worm gear being rotationally fixed with respect to said shaft for rotation by said shaft but movable axially with respect to said rotatable gear, and means for limiting axial movement of said worm gear with respect to said movable gear to drive said movable gear, but said worm gear being adapted to axially float away from said limited means when said worm gea is verriden bys aid movable gear.

3. Apparatus according to claim 2 further including a stepper motor for driving said rotatable shaft.

4. Apparatus according to claim 2 wherein said limiting means is a shoulder fixed on said rotatable shaft and said worm gear is slidable on said rotatable shaft.

5. Apparatus according to claim 2 wherein said image member includes means for driving said image member at a peripheral speed slightly faster than the peripheral speed of a receiving sheet when said transfer drum is driven by said worm gear.

6. A multicolor image forming apparatus comprising:

a drum shaped, rotatable image member, means for forming a series of electrostatic images on said image member, said electrostatic image forming means including means for incrementally imagewise exposing said image member as said image member rotates past said exposure means, means for applying toners of different color to said electrostatic images to form a series of different color toner images, a transfer drum having a cylindrical surface to which a receiving sheet is securable, said transfer drum and image member being mounted to form a nip in which said image member contacts a receiving sheet secured to said cylindrical surface to transfer toner images in registration to the receiving sheet and to drive said transfer drum through contact with the receiving sheet, means for providing a separation between said transfer drum and said image member when no receiving sheet is in the nip and means for rotating said tansfer drum independently of said image member, said means for rotating said transfer drum including &2 a rotatable gear fixed with respect to said transfer drum, a rotatable shaft, a worm gear engaging said movable gear and mounted on said shaft, said worm gear being rotatable by said shaft but axially movable with resect to said rotatable gear, and means for limiting axial movement of said worm gear to drive said rotatable gear and said tansfer drum, said worm gear being adapted to move away from said limiting means when oerriden by said transfer drum.

7. Apparatus according to claim 6 wherein said exposure means includes a laser.

8. Apparatus according to claim 6 including means for driving said image member at a speed such that it drives said transfer drum faster than said transfer drum is driven by said worm gear.

9. An overridable drive comprising:

a drivable gear, first deive means coupled tos aid drivable gear for driving said drivable gear, said first means being in a completely noncoupled condition during an operative portion of the rotation of said drivable gear, a rotatable shaft, a worm gear engaging said drivable gear and mounted on said shaft, said worm being rotationally fixed with respect to said shaft for rotation by such shaft, but axially movably with respect to said drivable gear, second drive means for driving said shaft at a speed which would tend to drive said drivable gear at a speed less than the speed said gear is drivable by said first drive means, and means for limiting axial movement of said worm gear to drive said drivable gear during said noncoupled operative portion of the rotation of said drivable gear but said worm gear being adapted to float away from said limiting means when said worm gear is overridden by said drivable gear when said drivable gear is coupled to said first drive means.

* * * * *